United States Patent [19]

Carter et al.

[11] 3,913,038

[45] Oct. 14, 1975

[54] ELECTROMAGNETIC RADIATION FILTER FOR COAXIALLY FED HOT CHASSIS TELEVISION RECEIVER

[75] Inventors: George William Carter, Indianapolis, Ind.; Stephen Earl Hilliker, Tempe, Ariz.

[73] Assignee: RCA Corporation, New York, N.Y.

[22] Filed: Aug. 21, 1974

[21] Appl. No.: 499,415

[52] U.S. Cl. ............ 333/70 R; 333/70 S; 333/73 C; 333/79

[51] Int. Cl.$^2$ ........................ H03H 7/04; H03H 7/06; H03H 13/00

[58] Field of Search..... 333/70 R, 70 S, 73 R, 73 C, 333/79, 33; 325/492–495

[56] References Cited

UNITED STATES PATENTS 2,419,907 4/1947 Mole ................................ 333/70 R

*Primary Examiner*—James W. Lawrence
*Assistant Examiner*—Marvin Nussbaum
*Attorney, Agent, or Firm*—Eugene M. Whitacre

[57] ABSTRACT

A radio frequency filter for a television receiver adapted for coupling to an alternating current source having an earth ground and including a conductive chassis which, upon energization of the receiver by the current source, is coupled to one terminal of the current source and a radio frequency tuner coupled to the chassis. A coaxial cable utilized to couple radio frequency signals between a source of radio frequency signals and the tuner has inner and outer conductors. Capacitors are provided between the outer conductor and the chassis of the television receiver at a first point, a second point and a third point along the coaxial cable, the first point being adjacent the tuner and the second and third points being progressively further from the tuner. First means for elevating the impedance associated with at least the outer conductor of the coaxial cable while maintaining the characteristic impedance of the coaxial cable as a whole is associated with the outer conductor between the first point and the second point. Second means for elevating the impedance associated with at least the outer conductor of the coaxial cable is associated with the outer conductor between the second point and the third point. The combination of the means for elevating the impedance of the outer conductor and the capacitors provide for a reduction of undesirable radio frequency signals coupled to the tuner which are developed between the outer conductor and earth ground by electromagnetic radiation coupled to the coaxial cable between the source of radio frequency signals and the third point.

18 Claims, 2 Drawing Figure

ELECTROMAGNETIC RADIATION FILTER FOR COAXIALLY FED HOT CHASSIS TELEVISION RECEIVER

BACKGROUND OF THE INVENTION

This invention relates to radio frequency tuning systems and more particularly to a radio frequency filter employed to reduce the amount of undesirable signal coupled to a tuner of the television receiver resulting from electromagnetic radiation external to and coupled to a coaxial cable utilized to transmit desirable signals to the tuner.

A television receiver, wherein the chassis is coupled to an alternating current source for supplying operating power to the receiver without the benefit of a transformer (hot chassis), is provided with isolation sufficient to guarantee safety from electrical shock for an operator of the television receiver contacting metallic terminals and/or adjustment knobs on the television receiver. Terminals which are typically accessible to the operator of the television instrument are the antenna terminals.

Various antenna cable and cable coupling devices are used to transmit desirable television signals from an antenna to the tuner of the television receiver. Among these types are a balanced twin lead having a characteristic impedance of 300 ohms and a shielded coaxial cable having a characteristic impedance of 75 ohms. The 300 ohm twin lead has two conductors spaced a fixed distance apart to maintain a uniform impedance characteristic throughout its length. Constructed in this manner electromagnetic fields, other than the fields associated with the signal being transmitted by the twin lead (interfering fields), which are coupled to the two conductors will alter the fields of the signal being transmitted by the twin lead thus causing interference. The 75 ohm coaxial cable has two concentric conductors (i.e., an inner conductor and an outer or shield conductor). Interfering fields coupled to the two conductors of the coaxial cable do not alter the fields of the signal being transmitted by the coaxial cable thus no interference results.

When the 75 ohm coaxial cable is employed, the outer conductor of the coaxial cable is coupled to the hot chassis of the television receiver by a device having a relatively low impedance as compared to the characteristic impedance of the coaxial cable at radio frequency to provide an effective shielding from external undesirable electromagnetic fields and a relatively high impedance as compared to the source impedance of the alternating current source to prevent electrical shock to a person contacting the cable or antenna terminals. In order to keep any leakage current below an acceptable level (e.g. 0.5 MA) for the prevention of electrical shock to the television receiver operator while preventing unwanted electromagnetic radiation coupled into the conductors of the coaxial cable from developing a signal which interfers with the desirable signal coupled to the tuner, it is found that more than one conductive path is required.

SUMMARY OF THE INVENTION

In accordance with the present invention a television receiver adapted for coupling to an alternating current source for supplying operating power to the receiver, the source having an earth ground potential reference, the receiver including a conductive chassis coupled to the current source, a radio frequency tuner coupled to a chassis and a coaxial cable means having inner and outer conductors for supplying radio frequency signals to the tuner includes a radio frequency filter. The radio frequency filter comprises a first impedance means coupled between the chassis and the outer conductor at a first point for providing a relatively low impedance between the outer conductor and the chassis for radio frequency signals and for providing a relatively high impedance to the alternating current source. A second impedance means is coupled between the chassis and the outer conductor of the coaxial cable at a second point for providing a relatively low impedance between the outer conductor and the chassis for radio frequency signals and for providing a relatively high impedance to the alternating current source. Means is coupled at least to the outer conductors between the first point and the second point on the coaxial cable for providing an increase in series impedance associated with at least the outer conductors while maintaining the characteristic impedance of the coaxial cable. A means is coupled between the inner conductor and the radio frequency tuner for coupling the radio frequency signals existing between the inner conductor of the coaxial cable and the chassis to the tuner, the last-named means having a relatively high impedance to the alternating current source.

The invention will be further understood from the following description of a preferred embodiment thereof, when considered in conjunction with the accompanying drawings.

A BRIEF DESCRIPTION OF THE DRAWINGS

DETAILED DESCRIPTION

Figure 1:
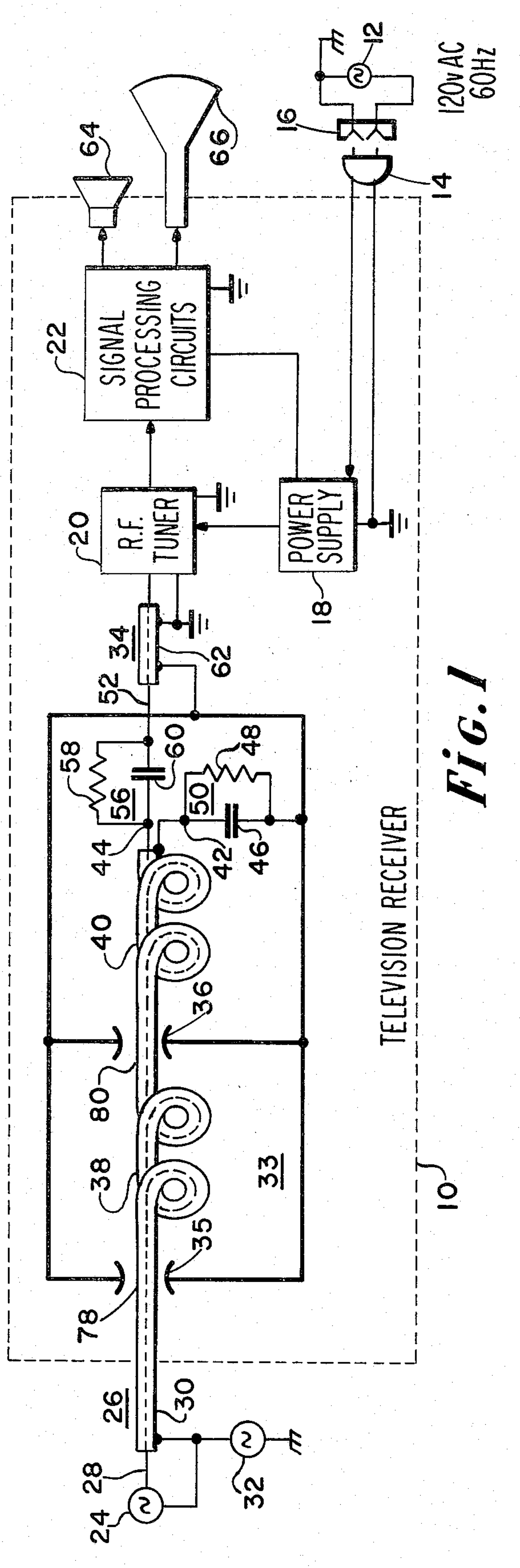
FIG. 1 is a schematic diagram of a television receiver embodying the invention.

Referring to FIG. 1, a television receiver 10 is adapted to be coupled to a source of alternating current 12 by means of a plug 14 and a receptacle 16. A first terminal of the alternating current source 12 is coupled to "earth" ground potential. The terminals of plug 14 may be inserted into the receptacle 16 as shown such that a second terminal of the alternating current source 12 is coupled to the television receiver 10 chassis ground, and the first terminal of alternating current source 12 is coupled to a power supply 18 which does not include an isolation transformer. Plug 14 coupled to the receptacle 16 in this manner places the chassis of the television receiver at a voltage above earth ground potential equal to that supplied by the alternating current source 12 (i.e., "hot chassis" condition). With the terminals of plug 14 inverted with respect to the terminals of receptacle 16 (a condition opposite to that shown) the chassis of the television receiver 10 would be coupled to earth ground potential. With the chassis coupled to earth ground potential the possibility of electrical shock to the operator of the television receiver 10 when the operator contacts the chassis or externally accessible electrically conductive components coupled thereto would be eliminated. To effect a worse case analysis, the plug 14 has been shown coupled to the receptacle 16 in a manner which would provide for "hot chassis" television receiver operational conditions.

Power supply 18 receives alternating current from the alternating current source 12 and converts this alternating current into direct current for powering various circuits in the television receiver 10. For example, the power supply 18 is coupled to a radio frequency tuner 20 and signal processing circuits 22.

Television receiver 10 is also coupled to a source 24 of radio frequency signals which are to be received by means of a coaxial cable 26. Coaxial cable 26 has an inner conductor 28 and an outer shielding conductor 30 which is concentric with the inner conductor 28. The source 24 of radio frequency signals to be received is coupled in the manner shown between the inner conductor 28 and the outer conductor 30 of shield cable 26 and provides for virtually total containment between the inner and the outer conductors of electrical and magnetic fields associated with the signals generated by the source 24 of radio frequency signals to be received. Undesirable electromagnetic radiation which exists in the environment of the coaxial cable 26 is represented by a source of undesirable radio frequency signals 32 which is coupled between the outer conductor 30 of the coaxial cable 26 and earth ground potential. In certain physical locations the magnitude of the signal generated by the source of undesirable radio frequency signals 32 may be very large and in some instances may exceed the magnitude of the signal generated by the source of desirable radio frequency signals 24.

The coaxial cable 26 is coupled to a coaxial cable 34 by means of a radio frequency filter 33. The outer conductor 30 of coaxial cable 26 is coupled to the outer conductor 62 of coaxial cable 34 at a third point 78 by means of a feedthrough capacitor 35, at a second point 80 by means of a feedthrough capacitor 36 and at a first point 42 by means of a "capristor" 50. The "capristor" 50 includes a parallel combination of a capacitor 46 and a resistor 48. The capristor 50 provides for a relatively low impedance to radio frequency signals, a high impedance to low frequency signals (i.e., 60 Hz) and a finite resistance to DC. The finite resistance at DC provides for the discharge of any accumulated charge on the capacitor 46 resulting from leakage currents through the capacitor 46.

The inductance of at least the outer conductor of a second section 38 between the third point and the second point on the coaxial cable 26 is increased by placing ferrite beads concentric with the coaxial cable between the third point and the second point. The inductance of at least the outer conductor of a first section 40 between the second point and the first point 42 is created by placing ferrite beads concentric with coaxial cable between the second point on the coaxial cable and the first point 42. A fourth point 44 which is the termination of the inner conductor of coaxial cable 26 is coupled to an inner conductor 52 of the coaxial cable 34 by means of a capristor 56 which includes a parallel combination of a resistor 58 and a capacitor 60. An outer conductor 62 of coaxial cable 34 is coupled to chassis ground at the end of coaxial cable 34 which is coupled to the R.F. tuner 20. The inner conductor 52 of coaxial cable 34 remote from capristor 56 is coupled to the radio frequency tuner 20.

The radio frequency tuner 20 converts radio frequency signals into intermediate frequency signals by mixing a signal generated by a local oscillator and the received radio frequency signals to develop intermediate frequency (I.F.) signals for each selected radio frequency channel. The output of the radio frequency amplifier 20 is coupled to signal processing circuits 22. The signal processing circuits process the intermediate frequency signal to retrieve audio modulation and video modulation contained in the radio frequency signals and developed by the source of desirable radio frequency signals 24. A speaker 64 is coupled to the signal processing circuits 22 and converts the audio modulation into acoustic waves. A cathode ray tube 66 is coupled to the signal processing circuits 22 and provides for conversion of video modulation into light intensity and light position modulation.

In the operation of the television receiver 10 the alternating current source 12 is coupled by means of plug 14 and receptacle 16 to power supply 18 which in turn supplies power to the radio frequency tuner 20 and the signal processing circuits 22. Radio frequency signals generated by the source of desirable radio frequencies 24 are transmitted with very little attenuation to the radio frequency tuner 20 by the coaxial cable 26, radio frequency filter 33, and coaxial cable 34. Radio frequency signals generated by the source of undesirable radio frequency signals 32 are impressed across feedthrough capacitor 35 at the third point 78 and the series combination of the second section 38 of coaxial cable 26 and feedthrough capacitor 36 (i.e., the outer conductors of coaxial cables 26 and 34 are considered to have insignificant inductance as compared to first section 38 and second section 40). The second section 38 and feedthrough capacitor 36 provide a signal dividing effect (attenuation) of the undesirable radio frequency signal across feedthrough capacitor 36.

The attenuated undesirable radio frequency signal across feedthrough capacitor 36 at the second point 80 on coaxial cable 26 is impressed across the series combination of the first section 40 of coaxial cable 26 and capristor 50. The first section 40 and the capristor 50 provide for a dividing effect of the undesirable radio frequency signal across capristor 50. The signal developed across capristor 50 and the signal between the fourth point 42 and the first point 44 are coupled to the radio frequency tuner 20 via coaxial cable 34. The signals coupled to the tuner provide for audio and video production by speaker 64 and kinescope 66 via signal processing circuits 22.

The amount of undesirable radio frequency signals developed between the fourth point 42 and the outer conductor of coaxial cable 34 thus is doubly attenuated with respect to the undesirable radio frequency signal impressed across capacitor 35. The resultant reduction of undesirable radio frequency signals at the input of tuner 20 provides acceptable television receiver operation in the presence of undesirable electromagnetic field conditions.

Figure 2:
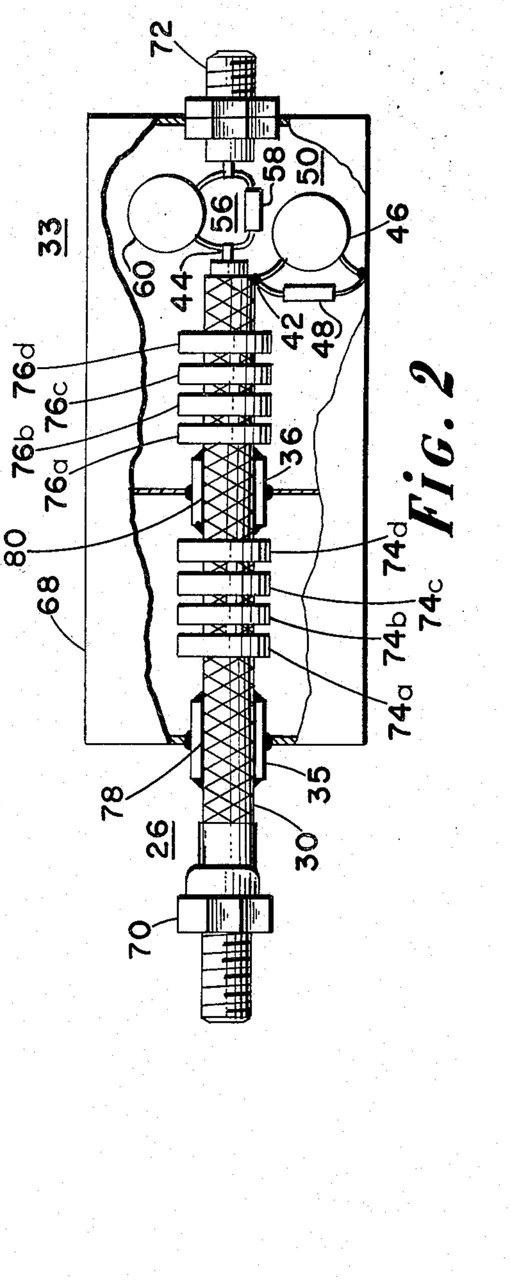
FIG. 2 is a cut-away view of a shielding enclosure housing the radio frequency filter components of FIG. 1 showing the relative location of the various filter components.

Referring to FIG. 2, the radio frequency filter 33 is shown enclosed in a shielding enclosure 68. A coaxial cable connector 70 coupled to coaxial cable 26 provides for connection to the source of desired radio frequency signals 24 as shown in FIG. 1. A coaxial cable connector 72 provides for connection to coaxial cable 34 shown in FIG. 1. The feedthrough capacitor 35 has one terminal connected to the outer conductor 30 of coaxial cable 26 at the third point 78 and another terminal connected to the shielding enclosure 68. Ferrite beads 74*a–d* are concentric with coaxial cable 26 between the feedthrough capacitor 35 and the feedthrough capacitor 36. Ferrite beads 74*a–d* increase the inductance of at least the outer conductor 30 of coaxial cable 26 between feedthrough capacitors 35 and 36, i.e., second section 38 of coaxial cable 26 while maintaining the characteristic impedance of that section of the coaxial cable 26. Feedthrough capacitor 36 has one terminal coupled to the outer conductor 30 of coaxial cable 26 and another terminal coupled to the shielding enclosure 68. Ferrite beads 76*a–d* are concentric with the coaxial cable 26 and increase the inductance of at least the outer conductor 30 of coaxial cable 26 between the feedthrough capacitor 36 and the first point 42, i.e., the first section 40 of coaxial cable 26. The capacitor 46 and the resistor 48 connected between the first point 42 and the shielding enclosure 68 form the capristor 50. The capristor 56 including a parallel combination of resistor 58 and the capacitor 60 are connected between the fourth point 44 and the coaxial connector 72.

In the preferred embodiment the undesirable signals at 55 MHz (Channel 2 picture carrier) as seen by the radio frequency tuner 20 are approximately 80db less than the undesirable signal generated by the source of undesirable radio frequency signals 32. At higher frequencies of undesirable signals the attenuation is even greater. This reduction in the undesirable signal coupled to the radio frequency tuner affords a considerable improvement in the performance of television receiver 10 in an environment where relatively high electromagnetic fields are present.

It should be recognized that various modifications of the particular parts and arrangements herein before described may be made within the scope of the present invention.

One particular configuration corresponding to that illustrated in FIGS. 1 and 2 is set forth in terms of component values:

| | |
|---|---|
| Feedthrough capacitors 35 & 36 | 1000pf |
| First and second sections 38 & 40 of coaxial cable 26 | 2.5μh |
| Capristors 50 & 56 | 470pf and 3 MEG OHMS |

What is claimed is:

1. In a television receiver adapted for coupling to an alternating current source for supplying operating power to said receiver, said source having an earth ground potential reference, said receiver including a conductive chassis coupled to said current source, a radio frequency tuner coupled to said chassis and coaxial cable means having inner and outer conductors for supplying radio frequency signals to said tuner, a radio frequency filter comprising:
   - first impedance means coupled between said chassis and said outer conductor at a first point for providing a relatively low impedance between said outer conductor and said chassis for radio frequency signals and for providing a relatively high impedance to said alternating current source;
   - second impedance means coupled between said chassis and said outer conductor of said coaxial cable at a second point for providing a relatively low impedance between said outer conductor and said chassis for radio frequency signals and for providing a relatively high impedance to said alternating current source;
   - means coupled at least to said outer conductor between said first point and said second point on said coaxial cable for providing an increase in series impedance associated with at least said outer conductor while maintaining the characteristic impedance of said coaxial cable; and
   - means coupled between said inner conductor and said radio frequency tuner for coupling said radio frequency signals existing between said inner conductor of said coaxial cable and said chassis to said tuner, said last-named means having a relatively high impedance to said alternating current source.

2. The combination as in claim 1 wherein said means coupled at least to said outer conductor between said first point and said second point comprises a material having high permeability at said radio frequency signals.

3. The combination as in claim 2 wherein said material having high permeability is of a tubular form and is concentrically mounted on said coaxial cable.

4. The combination as in claim 1 wherein said first impedance means comprises a first capacitor.

5. The combination as in claim 4 wherein said first impedance means further comprises a resistor coupled in parallel with said first capacitor.

6. The combination as in claim 1 wherein said second impedance means comprises a second capacitor.

7. The combination as in claim 6 wherein said second capacitor is of a tubular form having metalization on the inner and outer cylindrical surfaces forming plates of said second capacitor.

8. The combination as in claim 1 wherein said means coupled between said inner conductor and said radio frequency tuner comprises a third capacitor.

9. The combination as in claim 8 wherein said means coupled between said inner conductor and said radio frequency tuner further comprises a resistor coupled in parallel with said third capacitor.

10. In a television receiver adapted for coupling to an alternating current source for supplying operating power to said receiver, said source having an earth ground potential reference, said receiver including a conductive chassis coupled to said current source, a radio frequency tuner coupled to said chassis and coaxial cable means having inner and outer conductors for supplying radio frequency signals to said tuner, a radio frequency filter comprising:
   - first impedance means coupled between said chassis and said outer conductor at a first point for providing a relatively low impedance between said outer conductor and said chassis for radio frequency signals and for providing a relatively high impedance to said alternating current source;
   - second impedance means coupled between said chassis and said outer conductor of said coaxial cable at a second point for providing a relatively low impedance between said outer conductor and said chassis for radio frequency signals and for providing a relatively high impedance to said alternating current source;
   - third impedance means coupled between said chassis and said outer conductor of said coaxial cable at a third point for providing a relatively low impedance between said outer conductor and said chassis for radio frequency signals and for providing a relatively high impedance to said alternating current source;

means coupled at least to said outer conductor between said first point and said second point on said coaxial cable for providing an increase in series impedance associated with at least said outer conductor while maintaining the characteristic impedance of said coaxial cable;

means coupled at least to said outer conductor between said second point and said third point on said coaxial cable for providing an increase in series impedance associated with at least said outer conductor while maintaining the characteristic impedance of said coaxial cable; and means coupled between said inner conductor and said radio frequency tuner for coupling said radio frequency signals existing between said inner conductor of said coaxial cable and said chassis to said tuner, said last-named means having a relatively high impedance to said alternating current source.

11. The combination as in claim 10 wherein said means coupled at least to said outer conductor between said first point and said second point and said means coupled at least to said outer conductor between said second point and said third point comprise a material having high permeability at said radio frequency signals.

12. The combination as in claim 11 wherein said material having high permeability is of a tubular form and is concentrically mounted on said coaxial cable.

13. The combination as in claim 10 wherein said first impedance means comprises a first capacitor.

14. The combination as in claim 13 wherein said first impedance means further comprises a resistor coupled in parallel with said first capacitor.

15. The combination as in claim 10 wherein said second impedance means comprises a second capacitor and said third impedance means comprises a fourth capacitor.

16. The combination as in claim 15 wherein said second capacitor and said fourth capacitor are of a tubular form having metalization on the inner and outer cylindrical surfaces forming plates of said second capacitor.

17. The combination as in claim 10 wherein said means coupled between said inner conductor and said radio frequency tuner comprises a third capacitor.

18. The combination as in claim 17 wherein said means coupled between said inner conductor and said radio frequency tuner further comprises a resistor coupled in parallel with said third capacitor.

* * * * *